United States Patent
Jang

(10) Patent No.: US 7,866,758 B2
(45) Date of Patent: Jan. 11, 2011

(54) MANUFACTURING METHOD FOR MULTI-COLOR EXTRUDED ACRYLIC COSMETIC BRUSHES AND BRUSH HANDLES

(75) Inventor: Kyoung-Ae Jang, Tianjin (CN)

(73) Assignee: Anisa International, Inc., Atlanta, GA (US)

( * ) Notice: Subject to any disclaimer, the term of this patent is extended or adjusted under 35 U.S.C. 154(b) by 1298 days.

(21) Appl. No.: 11/187,095

(22) Filed: Jul. 22, 2005

(65) Prior Publication Data

US 2006/0017314 A1 Jan. 26, 2006

Related U.S. Application Data

(60) Provisional application No. 60/590,104, filed on Jul. 22, 2004.

(51) Int. Cl.
*A46B 5/00* (2006.01)
*B29C 47/04* (2006.01)

(52) U.S. Cl. .............. 300/21; 15/143.1; 264/173.17

(58) Field of Classification Search .......... 300/21; 15/143.1, 191.1, 192, 193; 264/173.18, 173.17, 264/148; 29/527.2
See application file for complete search history.

(56) References Cited

U.S. PATENT DOCUMENTS

| 4,937,141 | A | * | 6/1990 | Burns | 428/376 |
| 5,151,229 | A | * | 9/1992 | Burns | 264/51 |
| 6,254,712 | B1 | * | 7/2001 | Enlow et al. | 156/244.11 |
| 6,547,912 | B2 | * | 4/2003 | Enlow et al. | 156/244.23 |
| 7,297,171 | B2 | * | 11/2007 | Rosenflanz | 51/307 |
| 2005/0050662 | A1 | | 3/2005 | Williams | |
| 2006/0017314 | A1 | * | 1/2006 | Jang | 300/21 |
| 2007/0234496 | A1 | * | 10/2007 | Roberts et al. | 15/110 |

* cited by examiner

*Primary Examiner*—Lee D Wilson
(74) *Attorney, Agent, or Firm*—Alston & Bird LLP

(57) ABSTRACT

Provided is a method for manufacturing a multi-colored acrylic cosmetic brush handle comprising supplying two or more differently colored resins to an extrusion/injection machine, providing the machine with an open multi-chamber tool, extruding the two or more resins through the tool by multiple injection nozzles to form a multi-colored rod, cutting the rod to a desired length; and polishing the outer surface of the rod; and the multi-color cosmetic brush handle produced thereby. Also provided is a method of producing a cosmetic brush including the cosmetic brush handle of the present invention, and the multi-color cosmetic brush produced thereby.

5 Claims, 12 Drawing Sheets

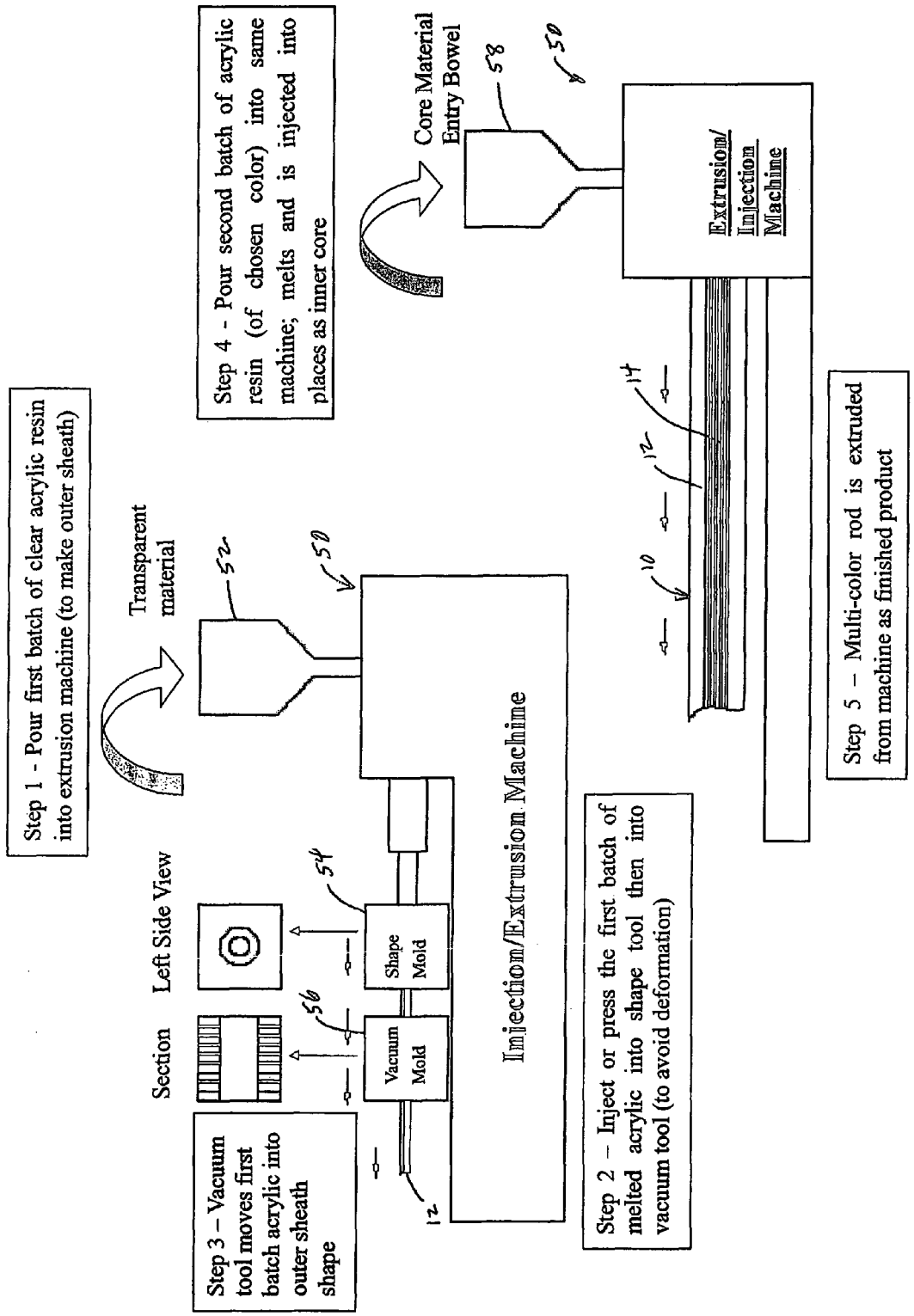

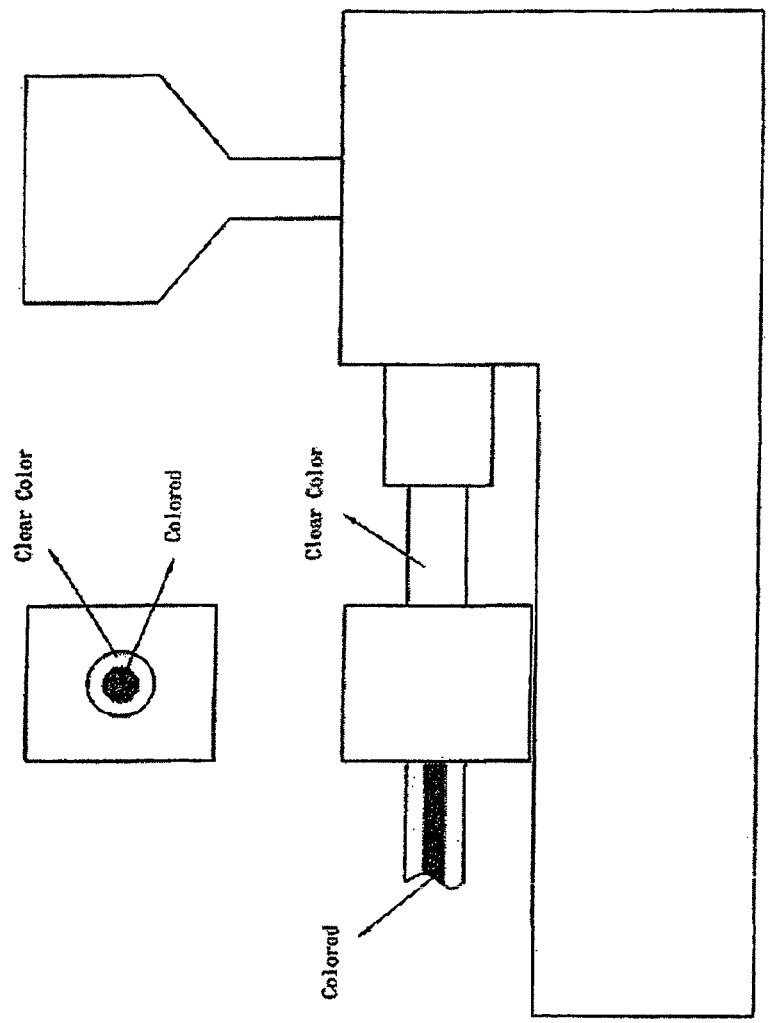

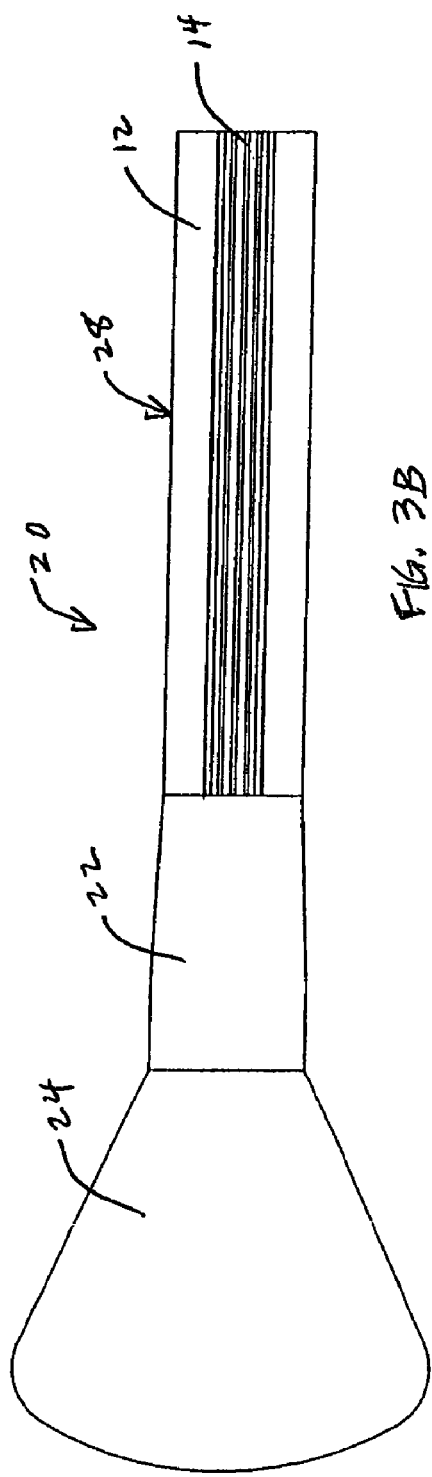
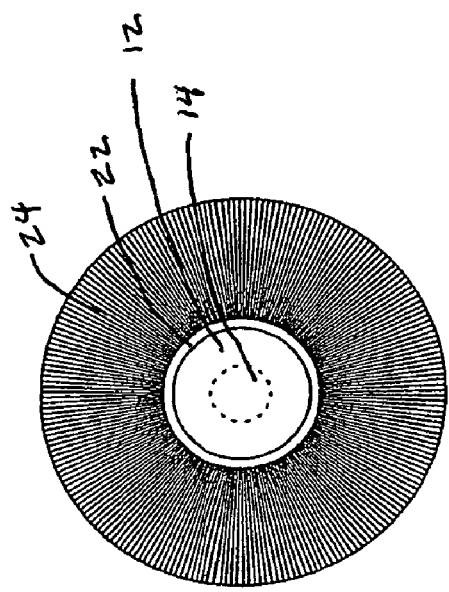

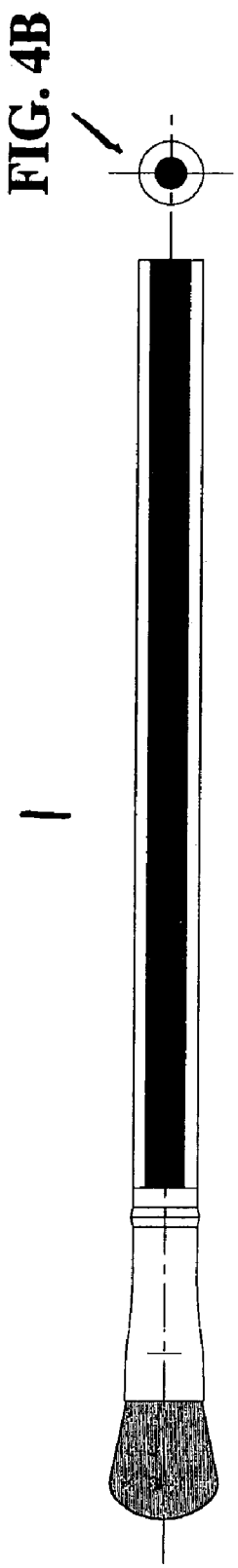
FIG. 4A   FIG. 4B
FIG. 4C   FIG. 4D

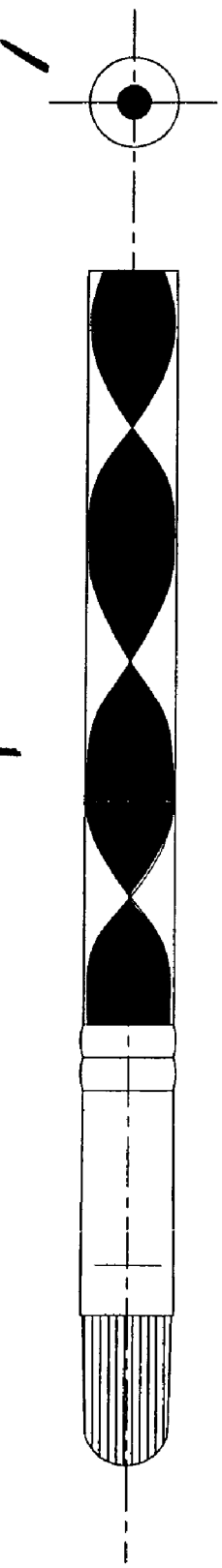
FIG. 5A
FIG. 5B
FIG. 5C
FIG. 5D

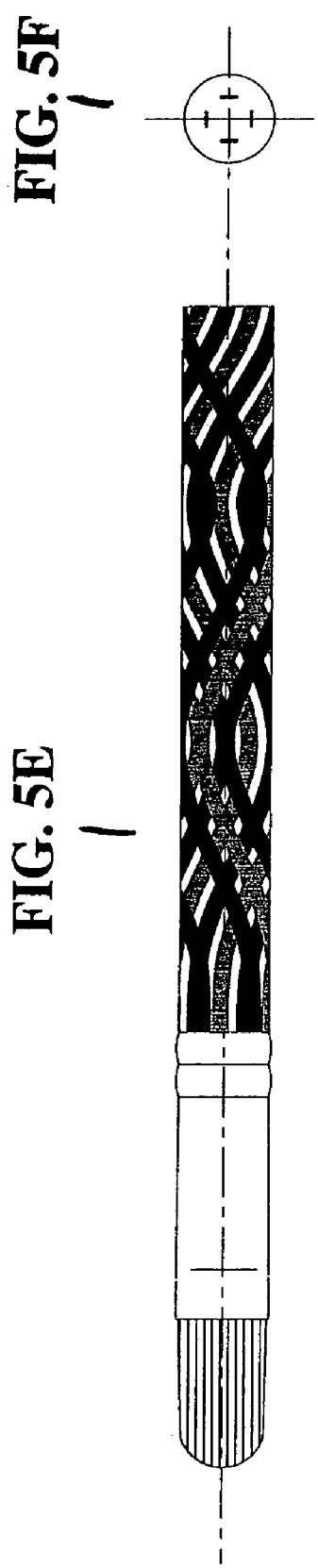

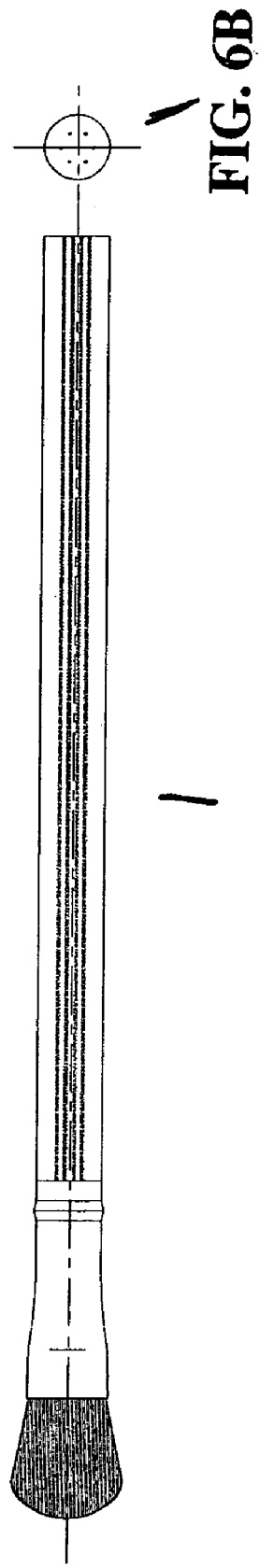

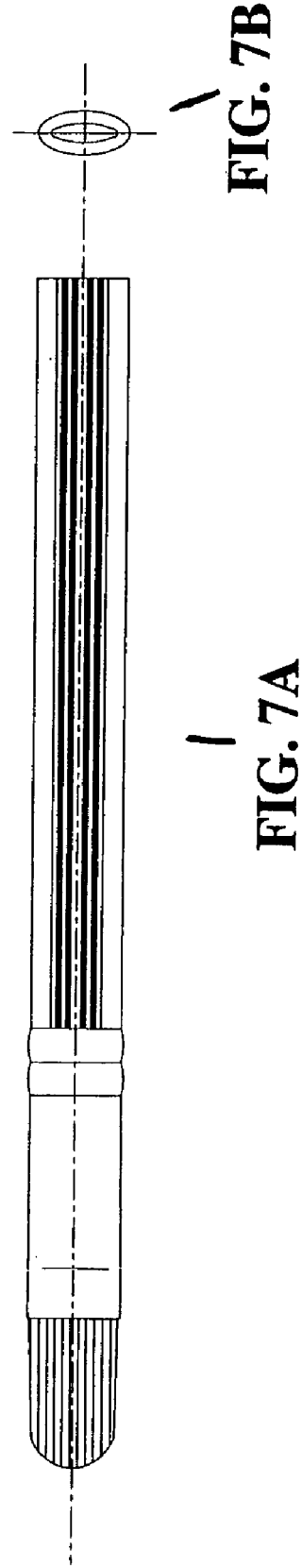

MANUFACTURING METHOD FOR MULTI-COLOR EXTRUDED ACRYLIC COSMETIC BRUSHES AND BRUSH HANDLES

CROSS-REFERENCE TO RELATED APPLICATIONS

The present application claims priority from U.S. Provisional Patent Application No. 60/590,104, filed on Jul. 22, 2004, which is incorporated herein by reference in its entirety.

FIELD OF THE INVENTION

The invention relates to the field of multi-color extruded acrylic articles. More particularly, the invention relates to the field of multi-color extruded acrylic applicator handles for cosmetic brushes.

BACKGROUND OF THE INVENTION

The cosmetics industry uses a wide variety of articles made from two or more different colors of plastic to serve as brush handles, applicator handles, lipstick tubes or cases, lip pencil handles, eye pencil handles, cosmetic compact cases, nail implement handles, and the like. Typically, such articles made from acrylics in two or more different colors by a cold pour (or casting) method.

Cold pour is a multi-step method in the prior art, requiring more than one piece of equipment, as illustrated in FIG. 9. First a single-colored acrylic resin is run through a standard injection molding machine to make a pre-determined, specifically-sized, single-color product that is shaped by the use of molds or tools. The shaping method may vary depending upon the requirements of the finished product. Then, a Formica resin, heated to its melting point, is manually poured into a freestanding cast mold, following which the injection molded piece is placed into the liquid Formica in the mold and is secured in place until the liquid Formica cools and sets. Thus, the solidified Formica creates an exterior portion that seals around the inner acrylic core, after which the finished product is removed from the molds.

A disadvantage of the cold pour method is that it cannot be performed using only a single injection molding or extrusion machine, rather it requires a secondary casting tool and additional steps to produce the final multi-colored product. Additionally, the cold pour method requires a tool that has been appropriately sized and shaped to the desired geometry of the finished product. As a result, open chamber (i.e., unlimited length) tools cannot be used. The casting mold determines the exact shape of the finished product. Further, the finished product comprises raw materials that are both acrylic and Formica. The product is not composed entirely of acrylic.

A need, therefore, has existed for an improved method of making a multi-colored acrylic cosmetic brush handle which is less labor intensive and less expensive to produce that presently available.

SUMMARY OF THE INVENTION

It is an object of the present invention to provide a method for making a multi-colored acrylic cosmetic brush handle and related cosmetic articles using only a single extrusion/injection molding machine. It is another object of the present invention to provide a method for making such a multi-colored acrylic product, using either an open chamber or a close chamber tool. It is yet another object of the present invention to provide a multi-colored acrylic cosmetic brush handle, brush having such a handle, and related cosmetic articles formed exclusively of 100% acrylic using the methods of taught herein.

These and other objects of the invention are achieved by a method, wherein according to the present invention a multi-colored acrylic rod is produced through an single extrusion process using an extrusion/injection machine. The method of the present invention is capable of making articles that are rods of virtually unlimited length having a clear or translucent outer sheath and a single or multi-colored inner core. The cross-sectional profile of the rods may be any desired shape, including generally cylindrical or square, or a special adaptation. The inner core may be formed in a single straight line, in multiple straight lines, or in a curved, swirled, or helical pattern of one or more colors, each of which is introduced by a separate extrusion nozzle, and shaped by multi-chamber shape tools during the extrusion process. Once the multi-color acrylic rods are cut to length, they may be used in a wide variety of cosmetic applications including several types of brush and applicator handles, hair or nail care implement handles, and tubes or cases for lipstick and cosmetic powders.

Additional objects, advantages and novel features of the invention will be set forth in part in the description, examples and figures which follow, all of which are intended to be for illustrative purposes only, and not intended in any way to limit the invention, and in part will become apparent to those skilled in the art on examination of the following, or may be learned by practice of the invention.

BRIEF DESCRIPTION OF THE DRAWINGS

For the purpose of illustrating the invention, there is shown in the drawings one exemplary implementation; however, it is understood that this invention is not limited to the precise arrangements and instrumentalities shown.

FIG. 1 is a schematic diagram illustrating the extrusion method of the present invention.

FIG. 2A is a schematic diagram illustrating the extrusion of an article of the present invention having a single colored straight-line core.

FIGS. 3A and 3B show an exemplary cosmetic applicator brush made using the extrusion method of the present invention. FIG. 3A is bottom end view of the brush; FIG. 3B is a side view of the brush showing a handle with a multiple straight line core.

FIGS. 4A-4D are manufacturing line diagrams of exemplary cosmetic applicator brushes using the present extrusion method, showing the design of the handle in greater detail. FIG. 4A shows a side view of a handle having a straight single line, round, single-color inner core and a clear outer sheath. FIG. 4B is a cross section of the handle of FIG. 4A. FIG. 4C shows a side view of a handle having a straight single line, square, single-color inner core and a clear outer sheath. FIG. 4D is a cross section of the handle of FIG. 4C.

FIGS. 5A-5D are manufacturing line diagrams of exemplary cosmetic applicator brushes using the present extrusion method, showing the design of the handle in greater detail. FIG. 5A shows a side view of a handle having a swirled or helical core. FIG. 5B is a cross section of the handle of FIG. 5A. FIG. 5C shows a side view of another handle having a multi-line core within a generally round rod, but having a waved outer surface. FIG. 5D is a cross section of the handle of FIG. 5C. FIG. 5E shows a side view of a handle having a swirled or helical core in multiple colors. FIG. 5F is a cross section of the handle of FIG. 5E.

FIGS. 6A and 6B are manufacturing line diagrams of exemplary cosmetic applicator brushes using the present extrusion method, showing the design of the handle in greater detail. FIG. 6A shows a side view of a handle having a plurality of generally cylindrical, small diameter shapes that are substantially parallel to the longitudinal axis of the rod, thus appearing as narrow rods or strips. FIG. 6B is a cross section of the handle of FIG. 6A.

FIGS. 7A and 7B are manufacturing line diagrams of exemplary cosmetic applicator brushes using the present extrusion method, showing the oval design of a handle in greater detail. FIG. 7A shows a side view of a oval handle having a plurality of generally cylindrical, small diameter shapes within an oval inner core, that are substantially parallel to the longitudinal axis of the oval rod, thus appearing as narrow rods or strips. FIG. 7B is a cross section of the handle of FIG. 7A showing the oval cross-sections of the rod and the inner core.

FIG. 8A shows a detail of the side version of the brush. FIG. 8B is a detail of the side view of the handle of the brush of FIG. 8A. FIG. 8C is a side view of a brush tip if the brush of FIG. 8A, detailing the view of the ferrule and brush hairs adapted to be mounted onto the cosmetic brush handle of the present invention.

DETAILED DESCRIPTION

The present invention provides a method for making multi-colored cosmetic brush handles from two or more differently colored acrylic resins in a single extrusion process performed by one extrusion/injection device.

Figure 2B:
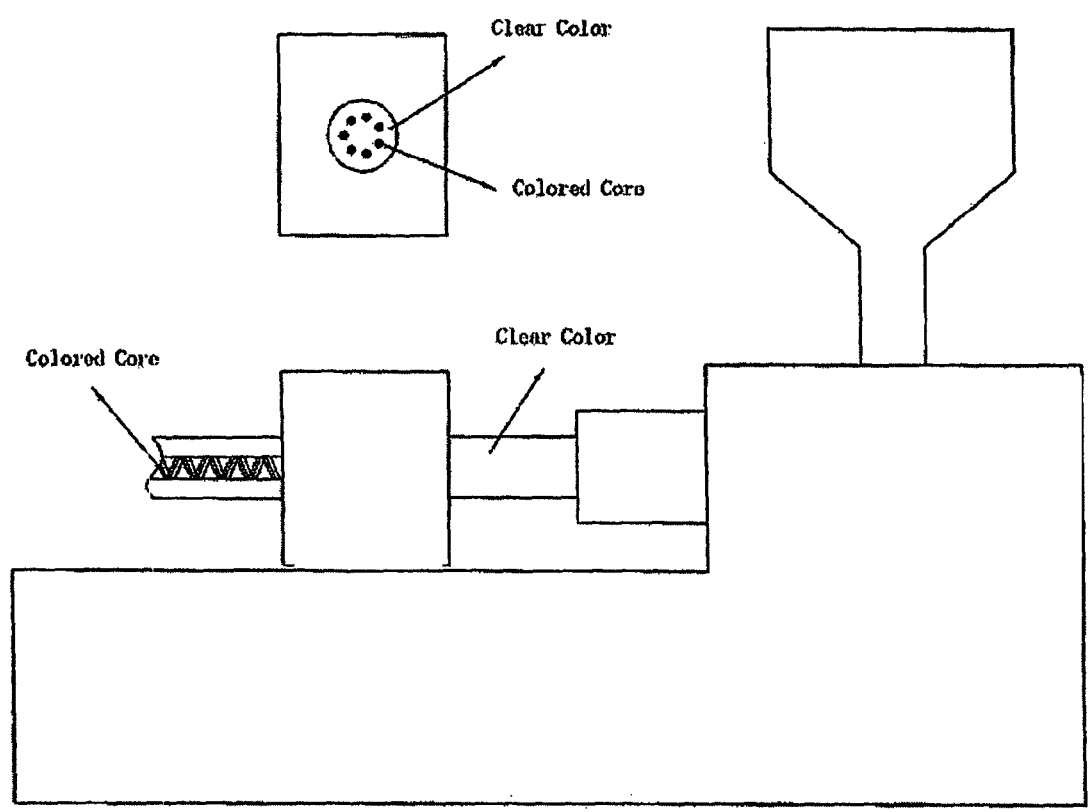
FIG. 2B is a schematic diagram illustrating the extrusion of an article of the present invention having a multi-colored swirl or helical pattern core.
Figure 2C:
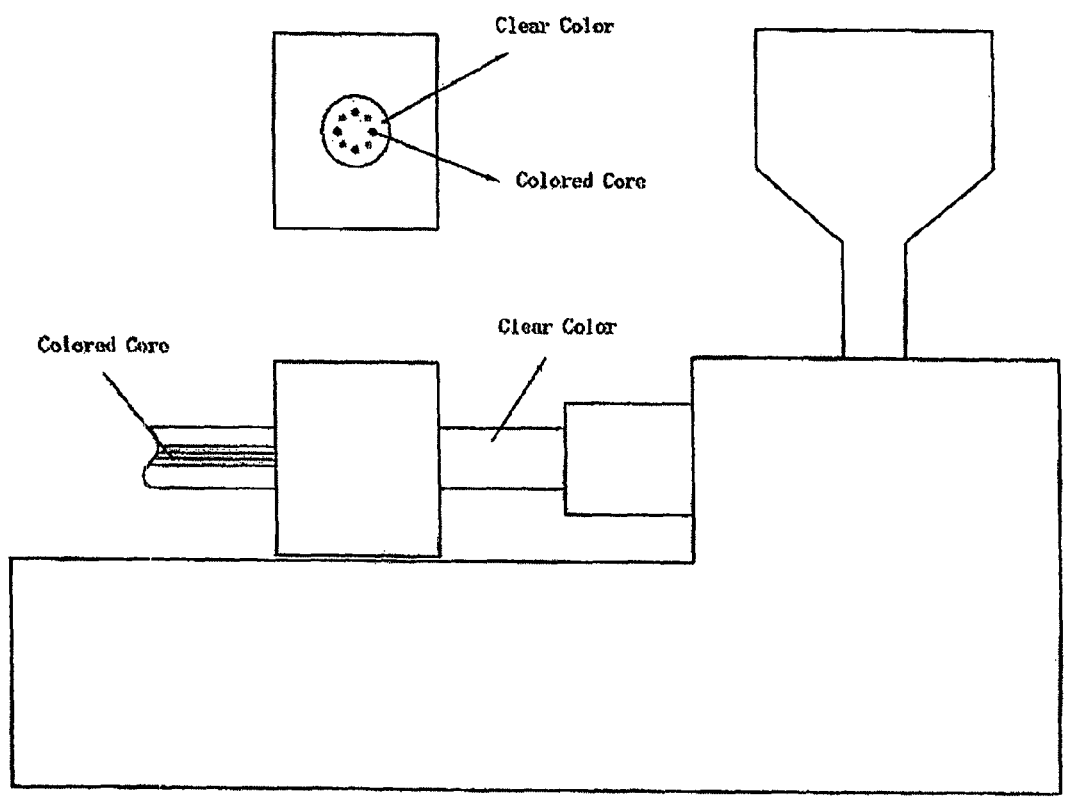
FIG. 2C is a schematic diagram illustrating the extrusion of an article of the present invention having a multi-colored multi-straight line core.

Referring now to the drawings, wherein like reference numerals identify like elements, components, subassemblies etc. FIGS. 1 through 2c depict the processing method of the present invention, wherein the extrusion/injection machine is indicated generally by the reference numeral 50 according to an embodiment of the present invention. FIG. 1 is a schematic flow diagram of the extrusion method, comprising a single extrusion/injection machine 50 to simultaneously make extruded rod 10, having outer sheath 12 and inner core 14. Machine 50 is also be referred to in the industry as an injection molding machine, particularly when used with a closed chamber tool or mold. In the present invention, machine 50 is utilized as an extrusion/injection machine in conjunction with an open chamber tool or dye.

Rod 10 is made by extruding and/or injecting two or more colored resins simultaneously using multiple injection nozzles and a multi-chambered shape tool or dye 54. A different injection nozzle is used for each color of acrylic used in making the rod 10, so that a two-colored rod 10 requires at least two nozzles, a three-colored rod 10 requires three nozzles, and so on as more colors are desired. One shape tool 54 is used having a number of chambers equal to the number of distinct forms desired within finished acrylic rod 10. The position and quantity of chambers in the shape tool or mold 54 determines the configuration of rod 10 as it is manufactured, since the mold 54 is responsible for the shape(s) of the inner hollow portion(s) of outer sheath 12 that will ultimately be filled by single or multi-colored inner core 14.

Although steps are indicated on FIG. 1, they are not entirely sequential. In Step 1, as denoted in FIG. 1, a first, preferably clear or translucent (referred to for purposes of description below, simply as 'clear'), acrylic resin is fed into hopper 52 of extrusion/injection machine 50. This clear resin is heated and melted until it is sufficiently malleable or fluidized to be extruded. In Step 2, as denoted in FIG. 1, the clear acrylic is extruded into standard tool or mold 54, which shapes the acrylic being forced or drawn out of machine 50 into a clear acrylic tube or form having one or more inner hollow portions. In Step 3, as denoted in FIG. 1, the acrylic tube passes through vacuum tool 56, which draws outer sheath 12 into its desired final shape to preserve the one or more inner hollow portions.

Preferably at the same time that clear acrylic resin is fed into the hopper 52 in Step 1, colored acrylic resin is fed into a hopper 58 of the same extrusion/injection machine 50, denoted as Step 4 in FIG. 1. This colored resin is heated and melted until it is sufficiently malleable or fluidized to be extruded. In Step 5, as denoted in FIG. 1, the colored acrylic resin is extruded and injected into the inner hollow portion of outer sheath 12 to form inner core 14. Step 5 preferably occurs concurrently with Steps 2 and 3, so that a multi-colored acrylic rod 10 emerges from extrusion/injection machine 50 in the final shape, for example a round, square or oval in cross-section. In other embodiments the rod is extruded in a specialty shape, such as shown in FIGS. 5C and 5D, which is generally a round cylinder, having an outer waved surface. The simultaneous formation of extruded rod 10, having outer sheath 12 and inner core 14 provides for the making of rods 10 of unlimited length using open chamber tool 54. Additional hoppers may be added as additional colors are used.

The length of clear acrylic outer sheath 12 having a desired outer shape and inner hollow portion that may be manufactured by this method is unlimited. Similarly, there is no limit to the length of inner core 14 that can be simultaneously injected into the inner hollow portion of outer sheath 12. As a result, an unlimited length of extruded rod 10 may be manufactured by this method, bounded only by the supply of acrylic fed into hoppers 52 and 58, and theoretically the width of the manufacturing plant. Moreover, the inner core of the multi-color rod may be shaped according to selected design to be round, square or oval in cross-section as seen in the figures.

Once rod 10 had been extruded, it can be buffed and cut to length as desired to form cosmetic brush handles 28, as illustrated in FIGS. 3A and 3B. Each handle 28, having outer sheath 14 and inner core 12, is then fitted at one end with ferrule 22 adapted to receive brush hairs or bristles 24. The ferrule cap 22 is attached to the handle 28 in any conventional manner including by crimping or with adhesive. The selection of ferrules and the means for attaching them to a handle are known in the art.

A finished brush 20 comprises an acrylic brush handle 28, a multitude of brush hairs 24, and a ferrule 22 interconnecting an end of brush handle 28 with brush hairs 24. The brush handle 28 has a distal end used to attach the bristles or brush hairs, and a proximal (unattached) end. One open end of the ferrule 22 is attached to the distal (brush-end) of the brush handle 28 and the opposing end of the ferrule 22 is attached to retain the brush hairs 24 in any conventional manner, such as by crimping or with an adhesive, or a combination thereof. Extruded rods 10 may be made in a wide range of diameters, such as from approximately 6 mm to approximately 200 mm. Different diameter rods 10, and thus different diameter cosmetic brush handles 28, are used to make different sizes of cosmetic brushes 20. Bush handles 28 may be made in a wide range of diameters, preferably ranging from approximately 5 mm to approximately 30 mm. The bristles or brush hairs are selected from a wide range of hairs, such as goat, sable and the like, well known in the art.

There are innumerable variations and combinations of outer sheaths 12 and inner cores 14, both in shape and coloration. Outer sheath 12 is preferably transparent or translucent, and is more preferably clear acrylic. In one embodiment of rod 10, inner core 14 is a single color and forms a single generally cylindrical shape that is substantially parallel to or co-axial with the longitudinal axis of rod 10, as illustrated in FIGS. 2A-2D.

In another embodiment of rod 10, inner core 14 is a single color, but forms a curved, swirled (twisted), or helical shape, as illustrated in FIGS. 2B and 5A-5D, whereby a plurality of substantially parallel ribbons of colored acrylic spiral down the length of rod 10. Because inner core 14 in this embodiment of rod 10 comprises two or more individual swirled ribbons of colored acrylic, multiple colors may be used instead of a single color (FIGS. 5E and 5F). In yet another embodiment of rod 10, inner core 14 has more than one color of acrylic and forms a plurality of generally cylindrical, small diameter shapes that are substantially parallel to the longitudinal axis of the rod 10, as illustrated in FIGS. 6A and 6B, thus appearing as narrow rods or strips within rod 10. A single color acrylic may be used to form rod 10, having a similar plurality of generally cylindrical shaped ribbons comprising inner core 14, as illustrated in FIG. 3B. A similar design is shown in FIGS. 7A and 7B, wherein the cross-section of the rod and the inner core is a oval.

Each internal shape is achieved by using a different shape tool or mold 54 in extrusion/injection machine 50. Different single colored cores 14 are achieved by adding differently colored acrylic resins to the injection machine 50 in Step 4. Multiple colored cores 14 are achieved, as in Steps 4 and 5 of FIG. 1, by feeding differently colored acrylics into separate hoppers in machine 50 and extruding each color of acrylic through tool 54 into a portion of the inner hollow passages of outer sheath 12.

Figure 8A:
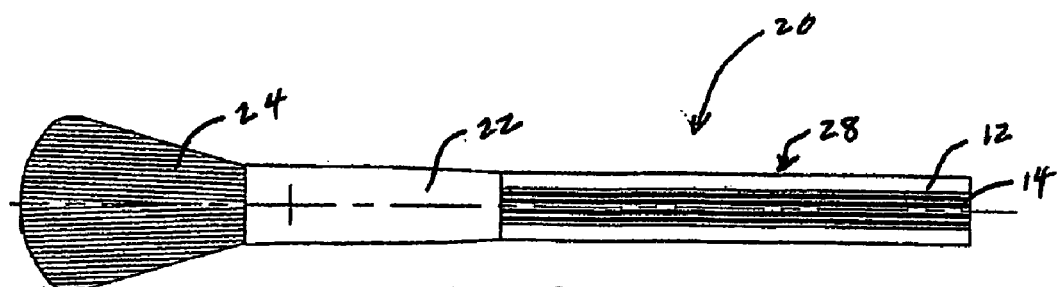
FIGS. 8A-8C are side views of an exemplary cosmetic applicator brush made using the extrusion method of the present invention.
Figure 8B:
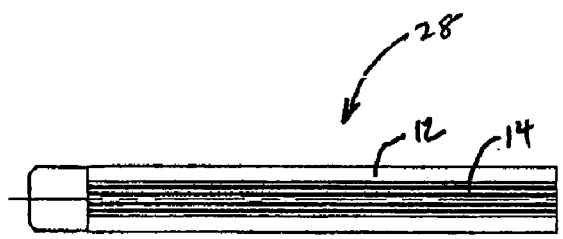
Figure 8C:
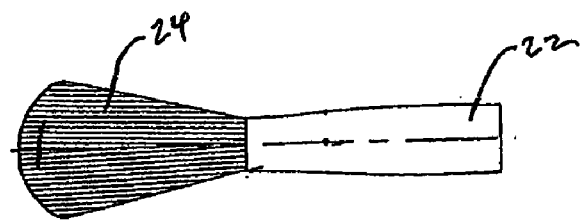
Figure 9:
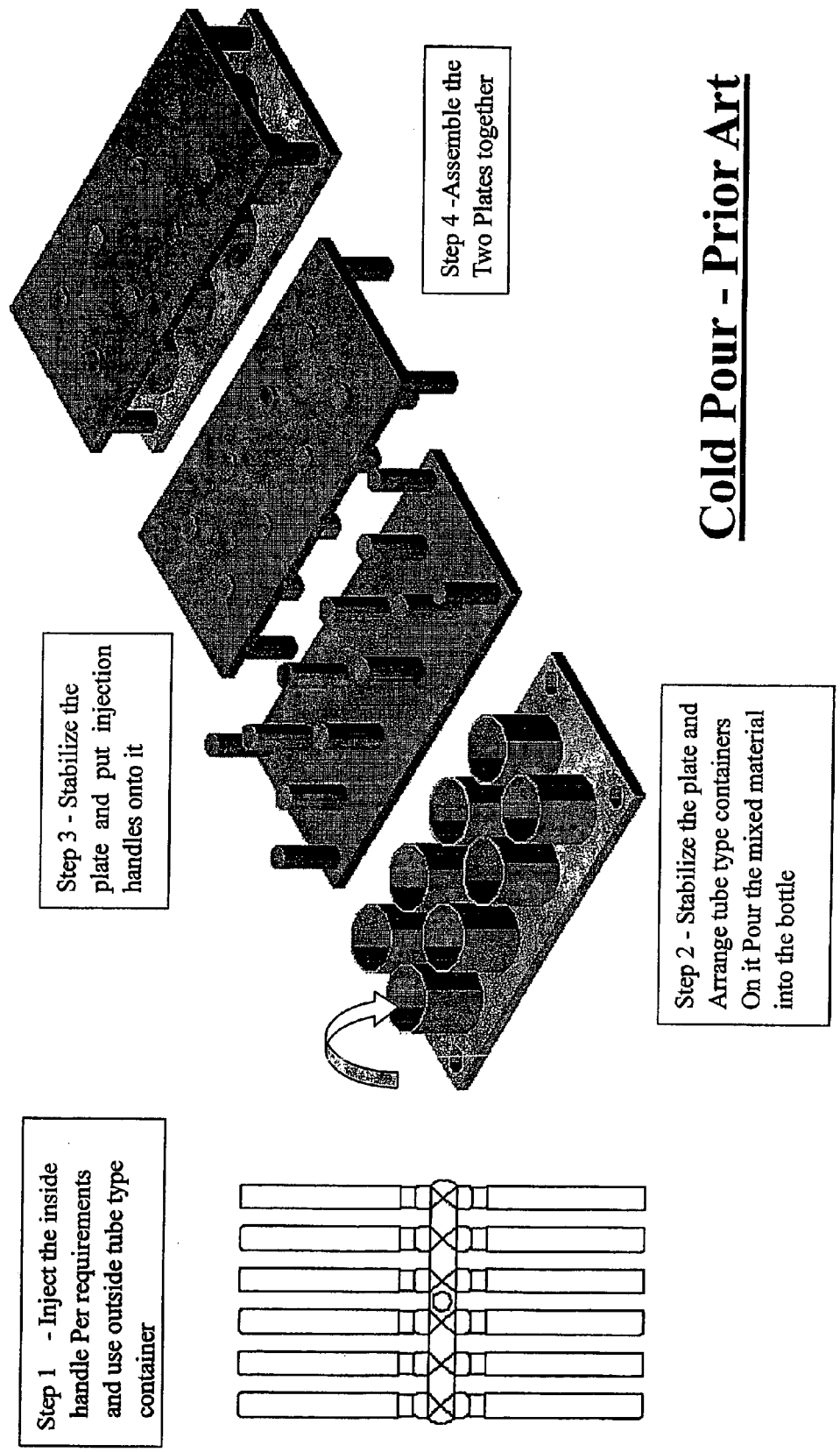
FIG. 9 is a schematic diagram illustrating the cold pour method of manufacturing a multi-colored article comprising acrylic and Formica in the prior art.

Once extruded rod 10 has been formed, having clear outer sheath 12 and single or multi-colored inner core 14, as described above, rod 10 is trimmed to length and shaped as desired to be used as a handle for a brush or cosmetics applicator. FIGS. 3A, 3B, and 8A show brush handle 28, cut down and polished from rod 10, assembled to a brush tip 24 by ferrule 22 to form a cosmetic applicator brush 20. Although brush handle 28, as shown therein, has a straight multi-line core 14 inside of clear outer sheath 12, it is readily envisioned that brush handle 28 having a straight single-line core or a helically twisted core could be substituted to form brushes 20 having various handle appearances.

An advantage of the method of the present invention over conventional methods is that it can be accomplished using a single extrusion/injection machine 50—a multi-colored rod 10 for use in multi-colored acrylic brush handles 28 can be produced without any additional equipment or production steps. The quantity and location of the colors in finished rod 10 are controlled solely by the selection of nozzles and multi-chambered shape tools or dyes 54 for machine 50.

Color combinations of rods 10 made by the present method are limited only by the colors of acrylic that are available. For example, one rod 10 may have a clear outer sheath 12 and a blue inner core 14. Another rod 10 may have a red outer sheath 12 and a clear inner core 14. Yet another rod 10 may have a clear outer sheath 12 with two or more distinct colors, such as gold, blue and red, forming inner core 14. The color combinations are unbounded.

Rods 10 may be manufactured in long rods, then cut to length; or may be made in finished length. For making long rods that will later be cut to length, an open chamber extrusion tool or dye 54 is used. This mold 54 controls the cross-sectional shape of the extruded article and allows production of an article of unlimited length, for so long as acrylic is supplied to the injection molding machine 50. The acrylic of different colors may be injected via two or more nozzles into the open chamber extrusion tool 54, producing a continuous multi-colored rod 10 of acrylic having outer sheath 12 and inner core 14. This continuous rod 10 exits machine 50 and extends to any preferred length until the supply of acrylic is exhausted or terminated. The outer dimensions of rod 10 are controlled by tool or dye 54. A rod 10 is typically circular, square or oval in cross-sectional shape, ranging from about 6 mm to about 200 mm in diameter. After extrusion, rod 10 is cut and buffed to meet the exact required dimensions and surface refinement of a finished product. Finished brush handles 28 can range from about 5 mm to about 30 mm in diameter, and are cut in lengths preferably ranging between about 40 mm and about 200 mm. For making rods 10 already at a finished length, a closed chamber tool or mold 54 may be used in conjunction with the same multi-nozzle process described above. Such a closed chamber tool 54 limits the length of the rod 10 that may be formed.

The method described herein may be used to make various multi-colored acrylic articles. In addition to the cosmetic brush handles discussed herein and shown in the attached figures, other articles may include cosmetic applicator handles, cosmetic lipstick tubes and cases, cosmetic lip pencil handles, cosmetic eye pencil handles, cosmetic compact cases (for containing color cosmetics or pressed powder), and nail or hair care handles (such as hair brushes and manicure or pedicure implement handles). By the practice of the present invention, one in the art could readily adapt the extruded two-color, acrylic products for such other cosmetic purposes. Although reference is made to "multi-colored" products and "two-colored" product for discussion purposes and in the claims below, it is clearly the intent of the present invention to further include two colors within the broad scope of "multi-colored" products.

Further, a variety of other modifications to the embodiments will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed:

1. A method for manufacturing a cosmetic brush having a multi-color acrylic handle, the method comprising:
   supplying two or more differently colored resins to an extrusion/injection machine, having an open multi-chamber tool;
   extruding the two or more resins through the tool by multiple injection nozzles, one nozzle for each color of acrylic resin, to form a multi-colored rod having simultaneously an outer sheath and an inner core;
   cutting the rod to a desired length to form a multi-colored acrylic cosmetic brush handle having a distal and a proximal end;
   polishing the outer surface of the brush handle;
   fastening a ferrule to the distal end of the brush handle with an open end of the ferrule extending away from the brush handle;
   inserting brush hairs into the open end of the ferrule; and
   fastening the ferrule onto the brush hairs.

2. A cosmetic brush, having a multi-colored acrylic brush handle produced by the method of claim 1.

3. The cosmetic brush of claim 2, wherein the multi-colored acrylic brush handle comprises a clear or translucent outer sheath and a colored inner core extending parallel to a longitudinal axis of the rod, wherein the inner core is round, square or oval in cross-section.

4. The cosmetic brush of claim 3, wherein the shape of the inner core of the brush handle is selected from the group consisting of a solid color or multiple colors shaped as a single substantially straight cylinder, multiple substantially straight cylinders, and multiple helically twisted parallel cylinders.

5. The cosmetic brush of claim 2, wherein the brush handle is either round or square in shape.

* * * * *